(12) United States Patent
Fraser et al.

(10) Patent No.: US 7,111,283 B2
(45) Date of Patent: Sep. 19, 2006

(54) PROGRAM HISTORY IN A COMPUTER PROGRAMMING LANGUAGE

(75) Inventors: Christopher W. Fraser, Seattle, WA (US); Todd A. Proebsting, Redmond, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 288 days.

(21) Appl. No.: 09/725,983

(22) Filed: Nov. 29, 2000

(65) Prior Publication Data

US 2002/0091998 A1 Jul. 11, 2002

(51) Int. Cl.
G06F 9/45 (2006.01)
G06F 9/44 (2006.01)

(52) U.S. Cl. ............... 717/136; 717/140; 717/141; 717/142; 717/143; 717/114

(58) Field of Classification Search ........... 717/136, 717/114, 158, 128, 140, 141, 142, 143
See application file for complete search history.

(56) References Cited

U.S. PATENT DOCUMENTS

| | | | | |
|---|---|---|---|---|
| 5,349,662 A * | 9/1994 | Johnson et al. | ............. | 717/128 |
| 5,379,427 A * | 1/1995 | Hiroshima | ............. | 717/128 |
| 5,642,478 A * | 6/1997 | Chen et al. | ............. | 714/45 |
| 5,754,861 A * | 5/1998 | Kumar | ............. | 717/128 |
| 5,768,596 A * | 6/1998 | Chow et al. | ............. | 717/154 |
| 5,950,003 A * | 9/1999 | Kaneshiro et al. | ............. | 717/130 |
| 5,978,586 A * | 11/1999 | Baisley et al. | ............. | 717/158 |
| 6,026,234 A * | 2/2000 | Hanson et al. | ............. | 717/133 |
| 6,026,241 A * | 2/2000 | Chow et al. | ............. | 717/152 |
| 6,173,444 B1 * | 1/2001 | Archambault | ............. | 717/159 |
| 6,189,142 B1 * | 2/2001 | Johnston et al. | ............. | 717/125 |
| 6,192,368 B1 * | 2/2001 | Gerard et al. | ............. | 707/103 R |
| 6,202,173 B1 * | 3/2001 | Hollett et al. | ............. | 714/38 |
| 6,223,187 B1 * | 4/2001 | Boothby et al. | ............. | 707/201 |
| 6,253,373 B1 * | 6/2001 | Peri | ............. | 717/158 |
| 6,349,406 B1 * | 2/2002 | Levine et al. | ............. | 717/128 |
| 6,367,070 B1 * | 4/2002 | Haghighat et al. | ............. | 717/143 |
| 6,598,012 B1 * | 7/2003 | Berry et al. | ............. | 717/130 |
| 6,598,225 B1 * | 7/2003 | Curtis et al. | ............. | 717/175 |

OTHER PUBLICATIONS

C. Young, M. D. Smith, "Static Correlated Branch Prediction", Sep. 1999, ACM, vol. 21, No. 5, p. 1028-1075.*
C. Gittinger, "HistoryManager", 1995, AEG Industry Automation, pp. 1-24 [retrieved online on Feb. 12, 2004]□□ http://exept.eu.org/cgi-bin/viewcvs.cgi/stx/libbasic3/HistoryManager.st?rev=1.50.*

(Continued)

*Primary Examiner*—Wei Zhen
*Assistant Examiner*—Qamrun Nahar
(74) *Attorney, Agent, or Firm*—Merchant & Gould P.C.

(57) ABSTRACT

A programming-language construct called a program history, and a method, system, apparatus, and data structure for translating computer source code that contains the program history construct. A program history captures data regarding the state of the program as it executes and makes this data available to functions called history operators, which operate on the data. The source code contains a history operand, an instance of the history operand, and the history operator. The presence of the history operand directs a translator to cause history data to be saved regarding the sequence of data that is associated with the operand instance as the program executes. The presence of the history operator directs the translator to cause a function to be performed that saves history data. In this way, the programmer is freed from writing tedious and error-prone bookkeeping code that declares variables and saves history data into those declared variables.

53 Claims, 13 Drawing Sheets

OTHER PUBLICATIONS

Y. Ashida, F. Ohata, K. Inoue, "Slicing methods using static and dynamic analysis information", 1999, IEEE, p. 344-350.*

Bobrow, D.G., et al., "The LOOPS Manual", *Xerox, Inc.,* Palo Alto, California, 1-124, (Dec. 1983).

Derby, T., et al., "A New Language Design for Prototyping Numerical Computation", *Scientific Programming,* vol. 5, 279-300, 1996.

Hanson, D.R., "Variable Associations in SNOBOL4", *Software-Practice and Experience,* vol. 6, 245-254. (1976).

Szymanski, B.K., "EPL—Parallel Programming with Recurrent Equations", *Parallel Functional Languages and Compilers,* ACM Press, New York, 51-104, (1991).

* cited by examiner

```
p = aList;
sum = 0;
count = 0;
while (p != NULL) {
    count += 1;
    sum += p->value;
    p = p->tail;
}
print ("average %f\n", sum/count);
```
405

```
p = aList;
while (p != NULL) {
    x = p->value;
    p = p->tail;
}
print ("average %f\n", average<x>);
```
450
465
455  460
400

FIG. 4

```
p = aList;
firstTime = true;
while (p != NULL) {
    if (firstTime) {
        firstTime = false;
    } else {
        printf (", ");
    }
    printf("%d", p->value);
    p = p->tail;
}
```
505

```
p = aList;
565~ while (p != NULL) {     560
    if (count<while> != 1) {
555     printf(", ");
    }
    printf("%d", p->value);
    p = p->tail;
}
```
550

```
607 ~ int max = a[0];
      for (i = 0; i < ARRAY_SIZE; i++) {
          if (max < a[i]) {
              max = a[i];
          }
      }
      printf ("Max is %f\n", max);
```

605

```
      for (i = 0; i < ARRAY_SIZE; i++) {
665 ~ x = a[i];
      }
      printf ("Max is %f\n", max<x>);
                                  ~    ~
                                 660  655
```

```
while (!eof(aFile)) {
765~  x = read(aFile);
      755-1          760-1
for (i = 0; i < length<x>; i++) {
  printf("%d %f", i, <x>[i]);
                     760-2   755-2
}
```

705

```
706~ intVector list;
     while (!eof(aFile)) {
       int x = read(aFile);
       list.append(x);
     }
     for (i = 0; i < list.length(); i++) {
       printf("%d %f", i, list[i]);
     }
```

805
806
printf ("x %s been assigned", length<x> ==0 ? "has not" :"has");
808

810
811
printf ("%d warning message(s) printed", length<warning>);
813

815
816
printf ("d lines of input read", length<gets>);
818

820
821
reset<x>
823

825
826
min<x-y>
828

```
while (...) {
    if (test(x)) {
965 ~ label:
        x = f(x);
    }
    }
    printf ("count: %d", count<label>);
                              960
                              955
```

905

```
906 ~ int counter = 0;
    while (...) {
        if (test(x)) {
            counter += 1;
            x = f(x);
        }
    }
    printf ("count: %d", counter);
```

```
1006 ~ int thenCount = 0;
1007 ~ int elseCount = 0;
       if (x > 0) {
          thenCount += 1;
          y = dx + dy;
       } else {
          elseCount +=1;
          y = dx - dy;
       }
       printf ("then: %d, else: %d",
          thenCount,
          elseCount);
```
1005

```
posTest:
   if (x > 0) {
1065-1 ~    y = dx + dy;
   } else {
1065-2 ~    y = dx - dy;
   }
   printf ("then: %d, else: %d",
1055-1 ~ count<posTest.then>, ~ 1060-1
1055-2 ~ count<posTest.else>);
                              ~ 1060-2
```
1050

```
1106~ int limit = 0;
      x = f(0);
      do {
          limit += 1;
          x = f(x);
          if (limit > 10000) break;
      } while (abs(x - prev<x>) > epsilon);
```

```
x = f(0);
do {
    x = f(x);
    if (count<while> > 10000) break;
} while (abs(x - prev<x>) > epsilon);
```

FIG. 11

```
p = aList;
while (p != NULL) {
    x = p.head();
match:
    found = equal(p.head, key);
    if (found) break;
    p = p.tail();
}
print (searching required %d probes\n", length<match:equal>);
                              1255        1260
```

PROGRAM HISTORY IN A COMPUTER PROGRAMMING LANGUAGE

TECHNICAL FIELD

This invention relates generally to computers, and more particularly to languages for programming computers.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © Microsoft Corporation, 2000. All Rights Reserved.

BACKGROUND OF THE INVENTION

A computer operates under the control of programs consisting of coded instructions called "object code" that execute on the computer. But, object code is not readily understood by humans, so a human programmer typically writes programs in a high-level programming language, such as BASIC, JAVA, PERL, PASCAL, C, C++, or the like, which are easier to understand. High-level languages generally have a precise syntax that defines certain permitted structures for statements in the language and their meaning. A translator such as a compiler translates the high-level language statements, called "source code" into object code. Thus, the terms "source code" and "object code" describe the form of a program prior to and after translation, respectively. Accordingly, the term "source code" generally refers to a program in its high-level programming language form. "Object code," on the other hand, generally refers to the program in the form of the coded instructions generated by the translator that are executable on a computer.

Typically, this translator is itself a program, which might be a compiler or an interpreter. A compiler is a program that translates all the source code into target code, which can be object code or byte code, prior to execution on the computer. An interpreter is a program that executes the source code by translating source statements into an "intermediate form" or data structure that is subsequently executed. The intermediate form is neither source code nor object code, but rather a structure that the interpreter can execute indirectly. The interpreter's translation into this intermediate form may be done at any granularity, from one statement at a time as needed to execute, all the way to a whole program at a time.

Writing computer programs, even in high-level source code, is a time-consuming and laborious process for the computer programmer. For many programs and programmers, the time to write a program is the most critical consideration. But, prior programming languages have significantly under-emphasized programmer convenience in language design. For example, many programming languages require the programmer to write code that merely performs bookkeeping functions, such as counting the number of times that some action has been taken. This bookkeeping code is tedious to write and prone to errors. Further, this bookkeeping code distracts the programmer from the main tasks of the program and lowers the programmer's productivity.

Thus, there is a need for programming language features that make writing programs easier and more convenient, in order to boost programmer productivity.

SUMMARY OF THE INVENTION

The above-mentioned shortcomings, disadvantages and problems are addressed by the present invention, which will be understood by reading and studying the following specification. The present invention encompasses a programming-language construct called a program history, and a method, system, apparatus, and data structure for translating computer source code that contains the program-history construct. A program history captures data regarding the state of the program as it executes and makes this data available to functions called history operators, which operate on the data.

The source code contains a history operand, instances of the history operand, and the history operator. In one aspect, the presence of the history operand directs a translator to generate object code that will save history data regarding the sequence of data that is associated with the operand instances as the program executes. The presence of the history operator directs the translator to generate object code that will perform a function on that saved history data.

In another aspect, the presence of the history operand directs a translator to save history data regarding the sequence of data that is associated with the operand instances as the program executes. The presence of the history operator directs the translator to perform a function on that saved history data.

In this way, the programmer is freed from writing tedious and error-prone bookkeeping code that requires variables and saves or computes history data into those variables.

BRIEF DESCRIPTION OF THE DRAWINGS

FIG. 4 is a block diagram that illustrates an example of using a program history to average the values in a list.

FIG. 5 is a block diagram that illustrates an example of using a program history to count iterations in a programming loop.

FIG. 6 is a block diagram that illustrates an example of using a program history to compute the maximum value of an element of an array.

FIG. 7 is a block diagram that illustrates an example of using a program history to print out a list of values read from input.

FIG. 8 is a block diagram that illustrates various examples of using a program history.

FIG. 9 is a block diagram that illustrates an example of using a program history to count the number of times that program execution has visited a particular location identified by a user-defined label.

FIG. 10 is a block diagram that illustrates an example of using a program history to count the number of times that program execution has visited a particular location using a user-defined label.

FIG. 11 is a block diagram that illustrates an example of using a program history to limit loop iterations to avoid diverging computations.

FIG. 12 is a block diagram that illustrates an example of using a program history restricted to a specified call site.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Introduction

The invention includes a new programming-language feature called a program history, which makes writing programs more convenient by eliminating tedious bookkeeping code, in programs. A program history captures aspects of past program states implicitly, thereby freeing the programmer from many error-prone and program-cluttering bookkeeping chores. Many different kinds of program histories can be implemented with low overhead, as illustrated below.

Hardware and Operating Environment

Figure 1:
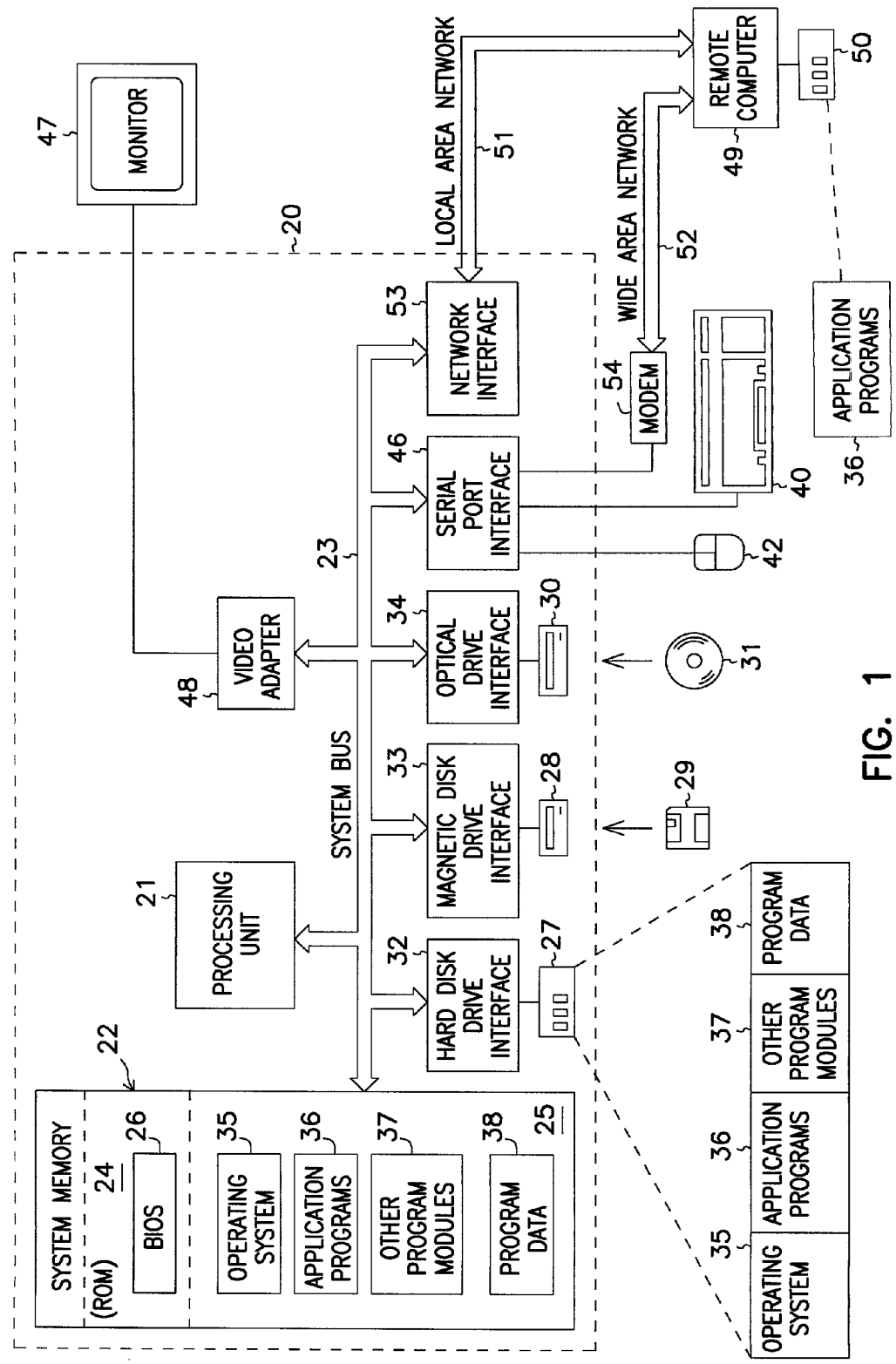
FIG. 1 is a block diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel-processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

As will be described in detail below, aspects of an embodiment pertain to specific method steps implementable on computers. In another embodiment, the invention can be implemented as a computer program product for use with a computer system. The programs defining the functions of the embodiment can be delivered to a computer via a variety of signal-bearing media, which include, but are not limited to:

(1) information permanently stored on non-writeable computer-readable media;

(2) alterable information stored on writeable computer-readable media; or (3) information conveyed to a computer by a communications media, such as through a computer or telephone network including wireless communications.

Such signal-bearing media, when carrying computer-readable instructions that direct the functions of the present invention, represent embodiments of the present invention.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide area network (WAN) 52. Such networking environments are commonplace in offices, enterprise-wide computer networks, Intranets, and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System-Level Overview

Figure 2:
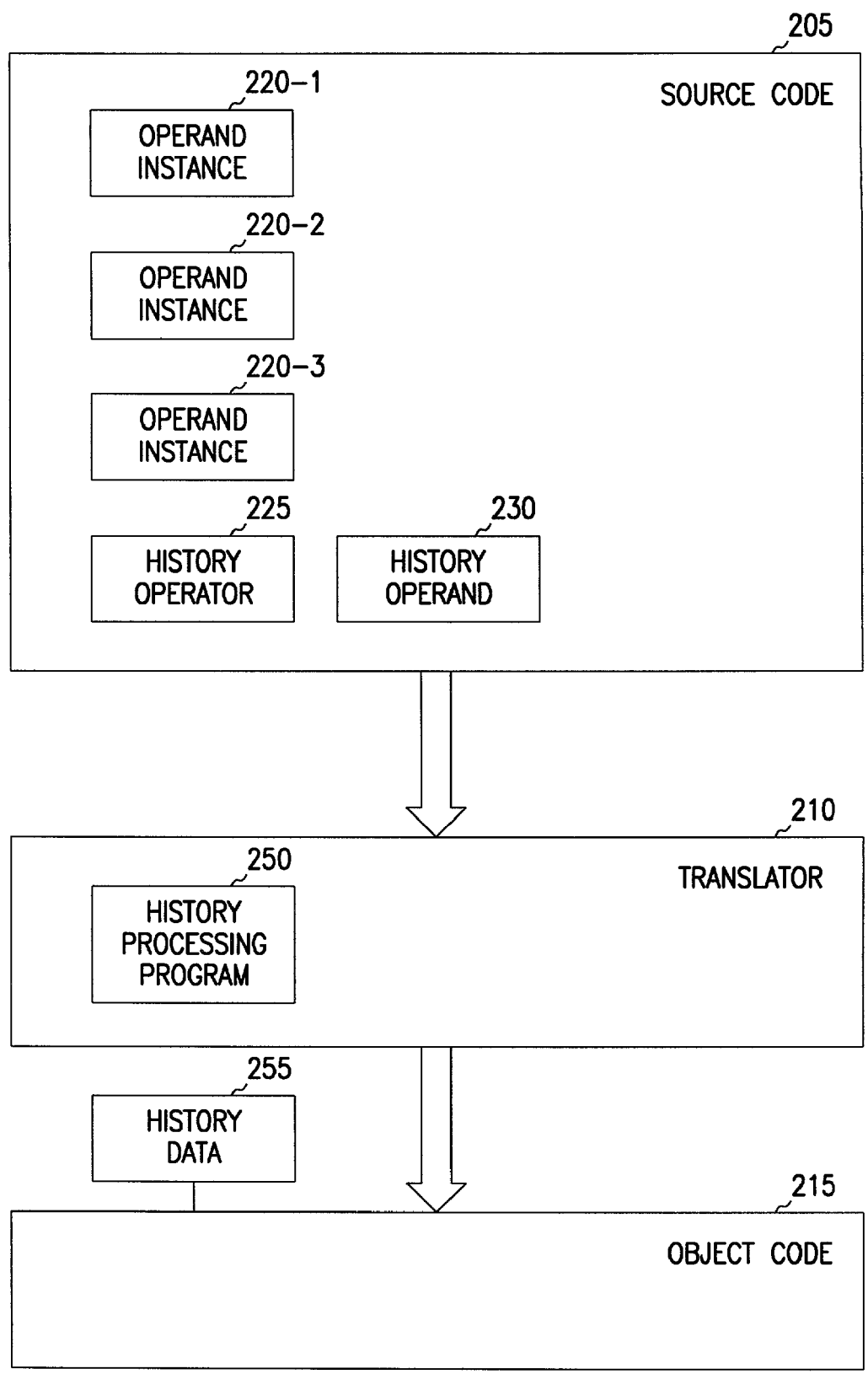
FIG. 2 is a block diagram illustrating a system-level overview of an exemplary embodiment of the invention.

FIG. 2 is a block diagram illustrating a system-level overview of an exemplary embodiment of the invention. FIG. 2 illustrates source code 205, translator 210, object code 215, and history data 255, all of which can be contained in system memory 22, as previously described in FIG. 1. In one embodiment, translator 210 translates source code 205 into object code 215 as further described below. Object code 215 creates history data 255 as further described below. In another embodiment, translator 210 interprets source code 205 to create history data 255, as further described below.

Source code 205 contains programming language statements that are generally understandable by a human. Source code 205 contains operand instances 220-1, 220-2, and 220-3, history operator 225, and history operand 230, which are all programming language statements or portions thereof.

Operand instances 220-1, 220-2, and 220-3 are programming language symbols representing variables, expressions, labels, functions, or memory locations. An operand instance can also be a heap-allocated object. Although this example shows three operand instances, any number can be present.

History operand 230 represents a sequence of data associated with the history of operand instances 220-1, 220-2, and 220-3. The sequence of data is stored in history data 255, as described below. Although one history operand is shown in FIG. 2, any number can be present.

History operator 225 represents a function that object code 215 will perform on the history data 255, which is represented by history operand 230. Many examples of history operator functions are given in FIGS. 4–12 and can include any function, such as sum, length, average, min, max, mean, trimmed mean, variance, mode, first, last, subsequence, any reduction function, and any statistical function. In addition, since history data represents a collection, a history operator can include functions for querying and filtering the collection. For example, a history operator can include a function that queries whether the value of a variable was ever less than zero. Since history data 255 can include information about where the definition occurred, history operator 225 can include a query for those assignments that occurred at a particular source coordinate (e.g., a query such as "Did this particular assignment ever result in x being less than zero?"). Although only one history operator is shown in FIG. 2, any number can be present.

Examples of operand instances, history operators, and history operands are shown below in FIGS. 4–12. The invention is not limited to the examples shown, and any type of operand instance, history operator, and history operand can be used.

Translator 210 contains history-processing program 250. Translator 210 can be a compiler, interpreter, assembler, or a pre-processor for a compiler, interpreter, or assembler.

A compiler initially performs lexical analysis on the source code to separate the source code into various lexical structures of the programming language (generally known as tokens), such as keywords, identifiers, operator symbols, punctuation, and the like. Then, through syntax analysis, the compiler groups the tokens into various syntax structures of the programming language, such as expressions, declaration statements, loop statements, procedure calls, and the like. Finally, the compiler generates and (optionally) optimizes executable object code for each of these structures.

An interpreter is a program that executes the source code indirectly. The source code is translated into an intermediate format known to the interpreter that the interpreter then executes. The translation may occur all at once, or piece-by-piece. It is possible that piece-by-piece translation may translate the same piece of source code many times or not at all.

An assembler is a program that converts assembly language programs, which are understandable by humans, into executable processor instructions. Assembly language is a low-level programming language that uses abbreviations or mnemonic codes in which each statement typically corresponds to a single processor instruction or a sequence of processor instructions. An assembly language and its assembler are typically specific to a given processor.

In one embodiment, history-processing program 250 detects history operand 230, finds operand instances 220-1, 220-2, and 220-3, and generates object code 215. Object code 215 contains coded instructions generated by translator 210 that are executable by processing unit 21, as previously described above. When executed, object code 215 creates history data 255 and executes history operator 225 on history data 255, as further described below in FIGS. 4–13. The format for history data 255 is described below in FIGS. 3A and 3B.

In another embodiment, history-processing program 250 detects history operand 230, finds operand instances 220-1, 220-2, and 220-3, creates history data 255, and executes history operator 225 on history data 255, as further described below in FIGS. 4–13.

In one embodiment, history data 255 contains a sequence of data that saves the history of the operand instances as object code 215 executes. History data 255 can contain such data as the history of values assigned to variables, the history of values read from variables, the history of program execution through various user-defined or language-defined labels, or the history of values returned from functions, as further described below. In another embodiment, history data 255 represents one or more storage locations or registers used as accumulators to process reduction operations (such as sum, count, maximum, minimum, and length); the accumulators are then updated at all assignments to a variable.

Figure 3A:
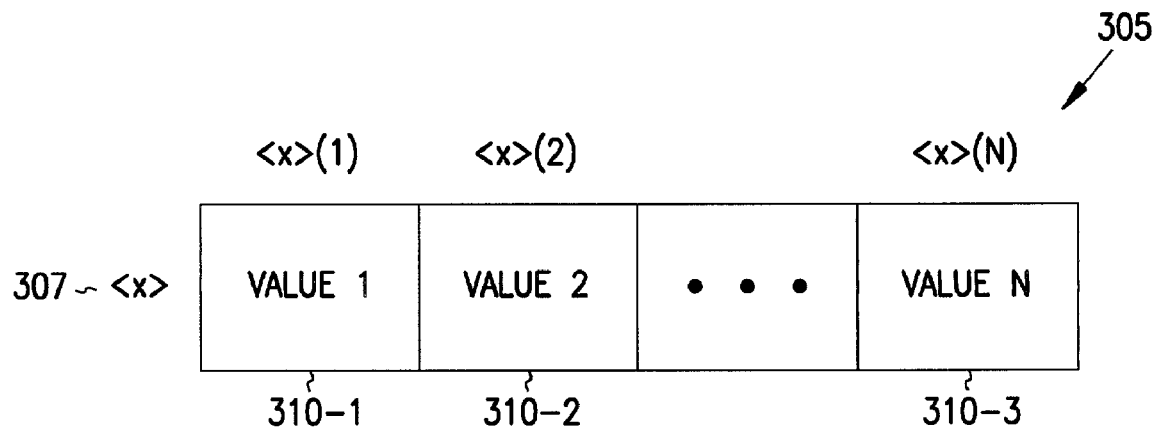
FIG. 3A is a block diagram of a primary data structure of an exemplary embodiment of the invention.

FIG. 3A is a block diagram of history data array 305, which is an example format for history data 255, as previously described in FIG. 2. Using the terminology of FIG. 2 to explain the context and format of history data 305, source code 205 contained history operand "<x>" 307, which caused history-processing program 250 to either create history data array 305 or to generate object code that, when executed, created history data array 305. In this example "< >" is used surrounding a variable name "x" in order to denote a history operand. But, any nomenclature can be used, such as "{ },""[ ],""( ),""##,""!!," or any other suitable keyword, including a keyword not consisting of a matched pair of symbols, as defined by the programming language in which source code 205 is written.

In one embodiment, history-processing program 250 then created object code, which, when executed, stored all the values assigned to the operand instance (the variable "x") in sequence in history data 305. History data 305 is a one-dimensional array containing the sequence of values that were assigned to variable x since the start of execution of object code 215 until the occurrence of history operator 225 and history operand 230. Thus, <x>(i) represents the $i^{th}$ element of <x>(i.e., the $i^{th}$ value assigned to x). Thus, <x>(1) contains $value_1$ 310-1, which is the first value that was assigned to variable x as the program executed. Analogously, <x>(2) contains $value_2$ 310-2, which is the second value that was assigned to variable x as the program executed, and <x>(n) contains $value_n$ which is the $n^{th}$ value that was assigned to variable x as the program executed. Although three values in history data 305 are illustrated, any number can be present. Although the array in history data 305 begins at index 1, any base can be used; for instance, in the C programming language, it would be logical for the first element to be at index 0, <x>(0).

Although not shown in FIG. 3A, in another embodiment history data 305 contains a length field or a sentinel at the end of the array, in order to facilitate the implementation of the length history operator.

Although the embodiment shown in FIG. 3A implements the history data as an array of contiguous words in memory, in another embodiment a linked-list is used. In still another embodiment, a file is used.

In yet another alternative embodiment to the array implementation described above, one or more accumulators are used for those history operators that fall into the category of reduction operations, such as sum, count, max, and min. Implementing reduction operations then only requires updating the accumulator at all assignments to the given variable. The overhead for using an accumulator is no greater than the overhead of the explicit computation, and an accumulator would save memory, which is especially important for those operands that have large amounts of history data.

Although the example of FIG. 3A focuses on values assigned to a variable, history data is not so restricted. The history data can also include the sequence of values read from a variable, which the programming language can indicate by another keyword defined by the programming, for example "[x]." Also, while the example of FIG. 3A focuses on the variable "x," any variable can be used. In addition, the history data can contain values other than those associated with variables, such as functions where, for example, "<f>" denotes the sequence of values that the function "f" has returned. Although "f" is used here, any function can be used.

Figure 3B:
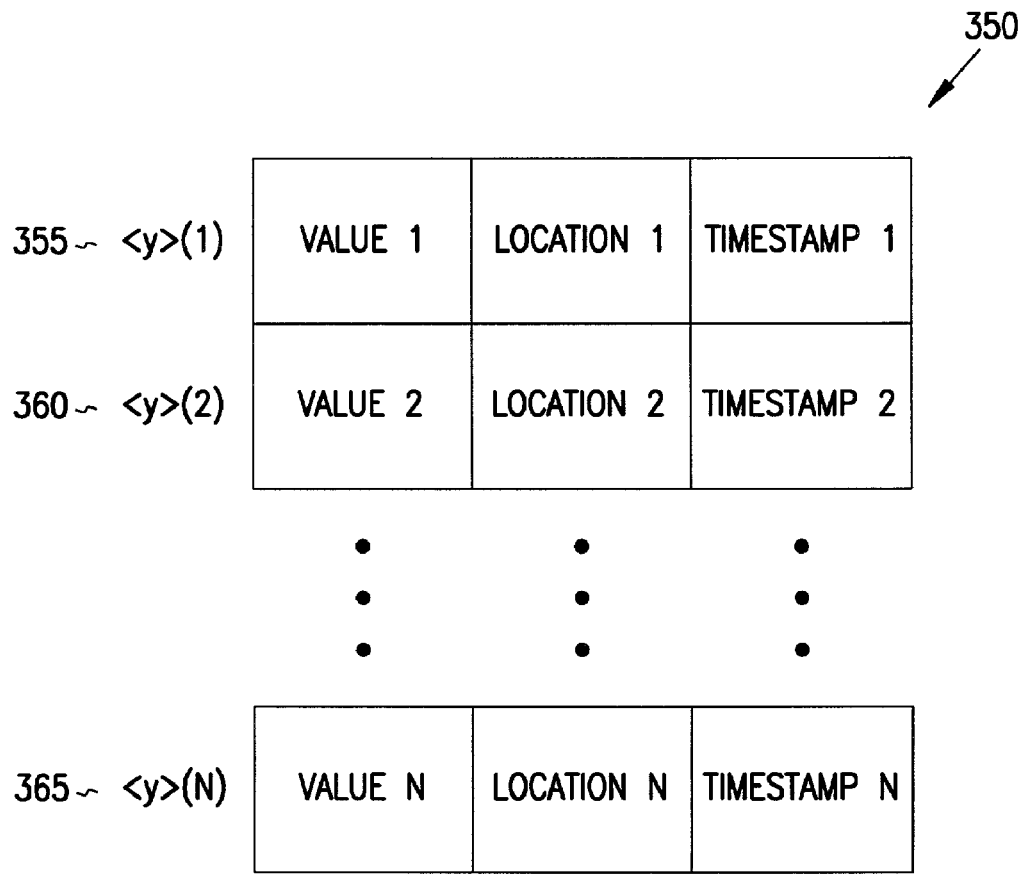
FIG. 3B is a block diagram of a primary data structure of an exemplary embodiment of the invention.

FIG. 3B is a block diagram of a history data array 350, which further generalizes the format of history data 255 shown in FIG. 3A. Using again the terminology of FIG. 2 to explain the context and format of history data 350 in FIG. 3B, source code 205 contained history operand "<y>", which caused history-processing program 250 to create history data array 350. In one embodiment, history-processing program 250 then created object code 215, which, when executed, stored data associated with the variable "y" in sequence in history data 305. In another embodiment, history-processing program 250 then stored data associated with the variable "y" in sequence in history data 305.

Thus, <y>(1) 355 contains $value_1$, $location_1$, and $timestamp_1$. $Value_1$, is the first value that was assigned to variable y as the program executed. $Location_1$ is the location in source code 205 where the first assignment occurred. $Timestamp_1$, is the time at which the first assignment occurred. The location information can be used by query operations to answer such questions as "What value was assigned to y the last time it was updated at this source coordinate?" or "How many times was variable y updated at source coordinate z?". The timestamp information—measured, for example, in CPU cycles, elapsed time, or absolute time —provides valuable profiling information.

Likewise, <y>(2) 360 contains $value_2$, $location_2$, and $timestamp_2$. $Value_2$ is the second value that was assigned to variable y as the program executed. $Location_2$ is the location in source code 205 where the second assignment occurred. $Timestamp_2$ is the time at which the second assignment occurred. Finally, <y>(3) 365 contains $value_3$, $location_3$, and $timestamp_3$. $Value_3$ is the third value that was assigned to variable y as the program executed. $Location_3$ is the location in source code 205 where the third assignment occurred. $Timestamp_3$ is the time at which the third assignment occurred. Thus, history data 350 is a two-dimensional array containing a sequence of values that were assigned to the variable "y" during execution of object code 215 prior to the occurrence of history operator 225 and history operand 230. In addition, history data 350 also contains data associated with the assignments. Although three values in history data 350 are illustrated, any number can be present.

Although three columns are shown in FIG. 3B —value, location, and timestamp —any number can be present. For example, in order to support function call histories and tracing, history data can include such columns as function arguments and return values, the call site, and the time of the call.

Although the example of FIG. 3B focuses on values assigned to a variable, history data is not so restricted. The history data can also include the sequence of values read from a variable, which the programming language can indicate by another keyword defined by the programming, for example "[y]." Also, while the example of FIG. 3B focuses on the variable "y," any variable can be used. In addition, the history data can contain values other than those associated with variables, such as functions where, for example, "<f>" denotes the sequence of values that the function "f" has returned. Although "f" is used here, any function can be used.

FIG. 4 is a block diagram that illustrates an example of using a program history to average the values in a list. Code segment 400 is contained within source code 205. Code segment 400 contains code fragments 405 and 450. Code fragment 405 contains a series of code statements representing printing out an average of values in a list using conventional programming techniques. Code fragment 450 contains a series of code statements representing printing out an average of values in a list using a program history function. Code fragment 450 contains average function 455, which is the history operator. The history operand, "<x>" 460 represents the history data, which is the sequence of values assigned to the variable "x." The operand instance is "x" 465.

As can be seen this example, by eliminating explicit bookkeeping code—such as initializing and updating accumulator values shown in code fragment 405—histories make programs shorter and simpler.

FIG. 5 is a block diagram that illustrates an example of using a program history to count iterations in a programming loop. Code segment 500 is contained within source code 205. Code segment 500 contains code fragments 505 and 550. Code fragment 505 contains a series of code statements representing printing a comma-separated list of values by explicitly maintaining a flag or counter to distinguish the first loop iteration from the rest. Code fragment 550 contains a series of code statements that accomplishes the same function as code fragment 505 but using a count history operator to count loop iterations. Code fragment 550 contains count function 555, which is the history operator. The history operand, "<while>" 560 represents the history data, which is the iteration count of the while loop, or more precisely, the number of times the innermost enclosing while loop has begun executing its body. The operand instance is the "while" loop keyword 565.

FIG. 6 is a block diagram that illustrates an example of using a program history to compute the maximum value of an element of an array. Code segment 600 is contained within source code 205. Code segment 600 contains code fragments 605 and 650. Code fragment 605 contains a series of code statements representing using an explicitly declared variable "max" 607 to find the maximum value of an element of an array. In contrast, code fragment 650 contains a series of code statements that accomplishes the same function as code fragment 650 but using a max history operator to find the maximum element. Code fragment 650 contains max function 655, which is the history operator. The operand instance is "x" 665. The history operand, "<x>" 660 represents the history data, which is the sequence of values that were assigned to the variable "x" between the time that the program began executing and the time that history operator 655 was executed. Thus code fragment 650 avoids the bookkeeping code associated with max variable 607.

In one embodiment, the max history operator is computed by having the history operand maintain an array of the history data associated with history operand <x> from which the maximum can be computed. In another embodiment, the computation is done directly by maintaining a single accumulator for the maximum that is updated at every assignment to operand instance x. This is true for functions that can be computed from accumulator values. For example, the "average" history operator can be computed efficiently from two accumulators, one for the sum and one for the count.

FIG. 7 is a block diagram that illustrates an example of using a program history to print out a list of values read from input. Code segment 700 is contained within source code 205. Code segment 700 contains code fragments 705 and 750. Code fragment 705 contains a series of code statements representing using an explicitly declared variable "list" 706 to contain the input values. In contrast, code fragment 750 contains a series of code statements that accomplishes the same function as code fragment 705 but using a length history operator to find the length of history operand, <x>. Thus, code fragment 750 frees the programmer from declaring "list" variable 706. Code fragment 750 contains length function 755-1 and index ("[ ]") function 755-2, which are the history operators. The operand instance is "x" 765. The history operands "<x>" 760-1 and 760-2 represent the history data, which is the sequence of values that were assigned to the variable "x" between the time that the program began executing and the time that their respective history operator (755-1, 755-2) is executed.

FIG. 8 illustrates some uses of histories that do not easily lend themselves to side-by-side comparisons of code. Code segment 800 is contained within source code 205. Code segment 800 contains code fragments 805, 810, 815, 820, and 825.

Code fragment 805 contains a series of code statements that determine whether a variable has ever been assigned a value, i.e., whether the variable is initialized. Note that code to perform this function without using histories would require maintaining a flag at possibly many assignment locations—without careful program analysis, all assignment locations would require maintaining the flag. Code fragment 805 contains length function 806, which is the history operator. Code fragment 805 further contains "<x>" 808, which is the history operand.

Code fragment 810 contains a series of code statements that prints the number of warning messages issued by reporting the number of calls to the function "warning." Note that to maintain this information explicitly would require tedious bookkeeping code that would maintain an additional variable. That variable would have to be incremented either at all call sites, or within the routine itself. Code fragment 810 contains length function 811, which is the history operator. Code fragment 810 further contains "<warning>" 813, which is the history operand. Thus, the history data is the history of all values returned by function calls to the "warning" function.

Code fragment 815 contains a series of code statements that counts the number of input records read using the "gets" function while processing a file. Code fragment 815 contains length function 816, which is the history operator. Code fragment 815 further contains "<gets>" 818, which is the history operand. Thus, the history data is the history of the values returned by the "gets" function.

Code fragment 820 contains a series of code statements that resets the history data to a null sequence. Programmers can use the reset function when they are interested in less than a complete history, such as the values assigned to a variable inside a specific loop. Code fragment 820 contains reset function 821, which is the history operator. Code fragment 820 further contains "<x>" 823, which is the history operand. The reset operator is different from other history operators in that it changes the history operand, rather than simply computing some function based on the history operand.

Code fragment 825 contains a series of code statements that illustrate a history operand that is an expression. An expression is a useful history operand because programmers may not only be interested in the value of a specific variable, but also in the history of how two or more variables are related. The semantics of such a history may be that a new sequence value is added to the history data whenever the value of either x or y changes. Other semantics associated with histories of expressions are also possible. Code fragment 825 contains minimum function 826, which is the history operator. Code fragment 825 further contains "<x-y>" 828, which is the history operand that is an expression. Although the expression "x-y" is shown in this example, any expression can be used.

FIG. 9 is a block diagram that illustrates an example of using a program history to count the number of times that program execution has visited a particular location. Code segment 900 is contained within source code 205. Code segment 900 contains code fragments 905 and 950. Code fragment 905 contains a series of code statements representing using explicitly declared variable "counter" 906 to count the number of times a code segment has been executed without using histories. In contrast, code fragment 950 contains a series of code statements that accomplishes the same function as code fragment 905 but using a count history operator to count the number of times program execution has visited a code statement identified by a user-defined label. When programmers want to refer to the history of a control construct, they label the construct. Thus, code fragment 950 frees the programmer from declaring a "counter" variable and explicitly incrementing it.

Code fragment 950 contains count function 955, which is the history operator. The history operand is "<label>" 960. Label 965 is the operand instance. The history operand "<label>" 960 represents the history data, which is the number of times that the code associated with label 965 was executed.

FIG. 10 is a block diagram that illustrates an example of using a program history to print out the number of times that program execution has visited the "then" and "else" branches of a compound, conditional statement. Thus, the example of FIG. 10 eliminates the need for the user-defined labels of FIG. 9.

FIG. 10 illustrates code segment 1000, which is contained within source code 205. Code segment 1000 contains code fragments 1005 and 1050. Code fragment 1005 contains a series of code statements representing using explicitly declared variables "thenCount" 1006 and "elseCount" 1007 to count the number of times the "then" and "else" legs of the conditional statement have been executed without using histories. In contrast, code fragment 1050 contains a series of code statements that accomplishes the same function as code fragment 1005 but using a count history operator.

Code fragment 1050 contains count functions 1055-1 and 1055-2, which are the history operators. The count functions count the number of times program execution has visited the "then" and "else" legs of the conditional "if" statement. Language-defined labels "<posTest.then>" 1060-1 and "<posTest.else>" 1060-2 are the history operands, each with its own history. These language-defined labels allow the programmer to refer to the "then" and "else components of the compound "if" statement, which begins at label "posTest". The legs 1065-1 and 1065-2 of the conditional "if" statement are the operand instances. The history operands represent the respective history data, which contains the number of times the respective program leg was executed. Thus, program fragment 1050 avoids the bookkeeping code of explicitly declaring, initializing, and incrementing variables thenCount 1006 and elseCount 1007.

FIG. 11 is a block diagram that illustrates an example of using a program history to limit loop iterations to avoid diverging computations. FIG. 11 illustrates code segment 1100, which is contained within source code 205. Code segment 1100 contains code fragments 1105 and 1150. Code fragment 1105 contains a series of code statements that use explicitly declared variable "limit" 1106 to limit loop iterations to avoid diverging computations. In contrast, code fragment 1150 contains a series of code statements that accomplishes the same function as code fragment 1105 but using a count history operator associated with the "while" loop.

Code fragment 1150 contains count function 1155, which is the history operator. The count function counts the number of times program execution has begun "while" loop 1165. The operand instance is "while" loop 1165. The history operand "<while>" 1160 represents the history data, which contains the number of times the while loop was executed.

As can be seen in these examples, program histories provide an effective tool for program introspection, profiling, and debugging. With histories, it is very easy for a programmer to write a function profiler that reports the number of calls to every function in the program. Likewise, it is easy to determine how many objects were allocated (e.g., by counting calls to malloc), or to determine whether the number of allocations equals the number of deallocations. By making these data easier to accumulate, histories enable programmers to exploit this information.

FIG. 12 is a block diagram that illustrates an example of using a program history restricted to a specified call site. FIG. 12 illustrates code segment 1200, which is contained within source code 205. Code segment 1200 contains code statements that search a list for a value and report how many comparisons were required before the value was found.

History operand <match:equal> 1260 is the sequence of values returned by the "equal" function at location "match." This history limits the history to a call-site, rather than the function's global history. The history operator is length function 1255, which returns the number of entries in the history data associated with history operand 1260.

Methods of an Exemplary Embodiment of the Invention

In the previous section, a system level overview of the operation of an exemplary embodiment of the invention was described. In this section, the particular methods performed by a computer of such an exemplary embodiment are described by reference to a flowchart. The methods to be performed constitute computer programs made up of computer-executable instructions. Describing the methods by reference to a flowchart enables one skilled in the art to develop such programs including such instructions to carry out the methods on a suitable computer where the processor of the computer executes the instructions from computer-readable media.

Figure 13:
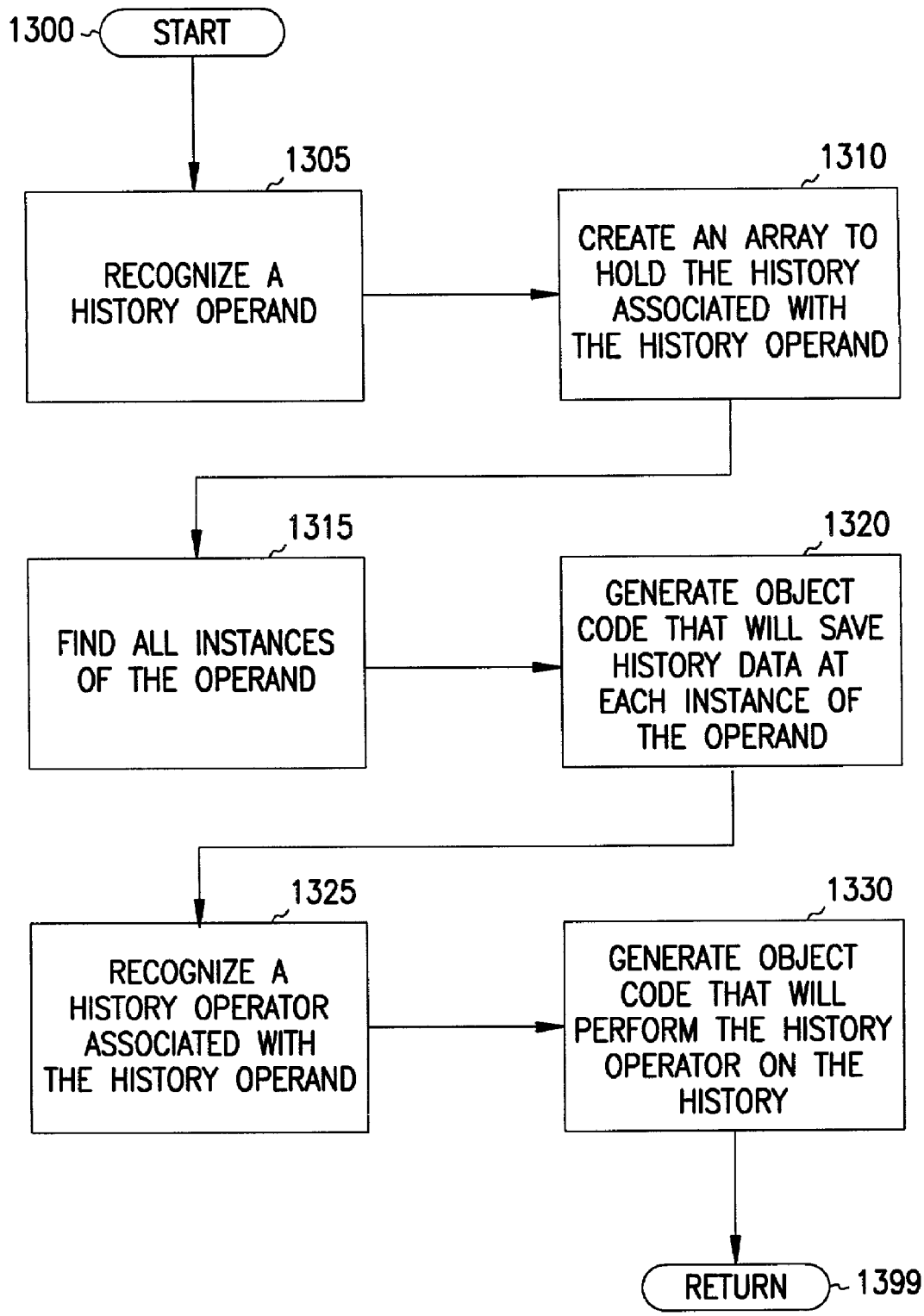
FIG. 13 is a flowchart illustrating processing flow of an exemplary embodiment.

FIG. 13 is a flowchart illustrating the processing flow of history-processing program 250 in an exemplary embodiment. Control begins at block 1300. Control then continues to block 1305 where history-processing program 250 recognizes a history operand in the source code being translated. Control then continues to block 1310 where history-processing program 250 allocates storage (such as arrays 305 or 350, a list, or a register or storage location to be used as an accumulator) to hold the history data associated with the history operand. In a two-pass compiler, blocks 1305 and 1310 would typically be executed during the first pass while the following blocks would typically be executed during the second pass.

In another embodiment, history-processing program 250 automatically keeps the histories for all variables, labels, memory locations, and functions, and objects used by the code in order to obviate the need for recognizing history operands and allocating storage for only for those recognized. This embodiment would make the history function better suited for one-pass compilers, interpreters, and assemblers.

Control then continues to block 1315 where history-processing program 250 finds all instances of the operand within the source code. Control then continues to block 1320 where history-processing program 250 generates object code within object code 215 that, when executed, will save history data at each instance of the operand. The object code generated at block 1320 accounts for scoping issues associated with global versus local variables. The generated object code also handles dynamic references to memory that cannot be determined at compile-time, such as pointer references and dynamic indexing into arrays. In another embodiment, history-processing program 250 does not create object code, but instead saves history data at each instance of the operand.

In the embodiment that uses an accumulator to implement reduction operators such as sum, count, max, and min, it is not necessary to save history data at each instance of the operand. Instead, implementing reduction operations only requires updating the accumulator at all assignments to the given variable.

Control then continues to block 1325 where history-processing program 250 recognizes the history operator associated with the history operand. Control then continues to block 1330 where history-processing program 250 generates object code that, when executed, will perform the history operator on the history data. In another embodiment, history-processing program 250 does not generate object code, but instead performs the history operator on the history data.

Control then continues to block 1399 where the function returns.

CONCLUSION

Histories provide programmers with convenient access to past program state. To maintain the same information explicitly—without histories—requires substantial effort. When programmers must maintain this historical program state (as with the examples above), the necessary bookkeeping code is a burden. Program histories liberate programmers from these chores.

Program histories provide an effective tool for program introspection, profiling, and debugging. With histories, it is very easy for a programmer to write a function profiler that reports the number of calls to every function in the program. Likewise, it is easy to determine how many objects were allocated or to determine whether the number of allocations equals the number of deallocations. By making these data easier to accumulate, histories enable programmers to exploit this information.

By eliminating bookkeeping and unnecessary code, program histories improve programmer convenience and increase programmer productivity.

We claim:

1. A computerized method for translating source code into object code, comprising:
   recognizing a history operator and a history operand in the source code wherein the history operator and the history operand are programming-language constructs, the history operand representing a sequence of data associated with a data history of a history operand instance and the history operator representing a function that object code will perform on the data history associated with the history operand;
   generating first object code that, when executed, saves the data history associated with an instance of the history operand; and
   generating second object code that, when executed, performs the history operator on the data history,
   wherein the history operator is capable of being referenced in the source code.

2. The method of claim 1, wherein the first object code further saves values assigned to a variable in the data history when the object code is executed.

3. The method of claim 2, wherein the data history further comprises program locations where the assignments occurred and timestamps indicating when the assignment was made.

4. The method of claim 1, wherein the history operand further comprises an expression of variables and wherein the first object code further saves a result of the expression in the data history.

5. The method of claim 1, wherein generating first object code further comprises allocating storage for the data history.

6. The method of claim 1, wherein performing the history operator on the data history further comprises:
   querying the data history based on contents of the data history.

7. The method of claim 1, wherein the history operand comprises a function and the data history comprises values returned by the function.

8. The method of claim 7, wherein the data history further comprises program locations where the values were returned and timestamps indicting when the values were returned.

9. The method of claim 1, wherein the history operand comprises a label associated with a source code statement, and wherein performing the history operator on the data history further comprises:
   counting a number of times the source code statement associated with the label was executed.

10. The method of claim 9, wherein the label is programmer-defined.

11. The method of claim 9, wherein the label comprises a programming language control construct.

12. The method of claim 1, wherein performing the history operator on the data history is a function selected from a group consisting of:
   summing the data history, averaging the data history, determining a maximum of the data history, selecting an element of the data history, determining a minimum of the data history, determining a number of values in the data history, determining a first entry in the data history, determining a last entry in the data history, determining a subsequence of the data history, performing a reduction operation, and performing a statistical function.

13. The method of claim 1, wherein:
the history operand comprises a programming language keyword representing a loop; and
the history operator comprises an iteration count of the loop.

14. The method of claim 1, wherein saving the data history further comprises:
saving the data history in an array, wherein each element of the array comprises a value associated with the history operand at a particular time.

15. The method of claim 1, wherein saving the data history further comprises;
saving the data history in a linked list.

16. The method of claim 1, wherein saving the data history further comprises:
saving the data history in a file.

17. The method of claim 1, wherein performing the history operator on the data history further comprises:
resetting the data history to null.

18. The method of claim 1, wherein saving the data history and performing the history operator further comprise updating an accumulator.

19. A computer-readable storage medium containing computer-executable code for performing steps comprising:
recognizing a history operator and a history operand in source code, wherein the history operator and the history operand are programming-language constructs, the history operand representing a sequence of data associated with a data history of a history operand instance and the history operator representing a function that object code will perform on the data history associated with the history operand;
the history operand directing a translator to generate first object code that, when executed, saves the data history associated with an instance of the history operand; and
the history operator directing the translator to generate second object code that, when executed, performs the history operator on the data history,
wherein the history operator is capable of being referenced in the source code.

20. The computer-readable medium of claim 19, wherein the history operand comprises a variable and the data history comprises values assigned to the variable.

21. The computer-readable medium of claim 19, wherein the history operand comprises an expression of variables and the data history comprises a result of the expression.

22. The computer-readable medium of claim 19, wherein the history operand comprises a heap-allocated object.

23. The computer-readable medium of claim 19, wherein the history operand comprises a function and the data history comprises values returned by the function.

24. The computer-readable medium of claim 23, wherein the data history further comprises program locations where the values were returned and timestamps indicating when the values were returned.

25. The computer-readable medium of claim 19, wherein the history operand comprises a label associated with a source code statement, and wherein performing the history operator on the data history further comprises:
counting a number of times the source code statement associated with the label has been executed.

26. A computer-readable storage medium having computer-executable instructions for performing steps comprising:

recognizing a history operator and a history operand in source code, wherein the history operator and the history operand are programming-language constructs, the history operand representing a sequence of data associated with a data history of a history operand instance and the history operator representing a function that object code will perform on the data history associated with the history operand;
finding at least one instance of the history operand in the source code in response to recognizing the history operand;
allocating storage; and
generating first object code associated with each instance, wherein the first object code, when executed, saves the data history associated with the history operand in the storage; and
generating second object code that, when executed, performs the history operator on the data history,
wherein the history operator is capable of being referenced in the source code.

27. The computer-readable medium of claim 26, wherein performing the history operator on the data history further comprises:
querying the data history based on contents of the data history.

28. The computer-readable medium of claim 26, wherein the history operand comprises a label associated with a source code statement, and wherein performing the history operator on the data history further comprises:
counting a number of times the source code statement associated with the label has been executed.

29. The computer-readable medium of claim 26, wherein performing the history operator on the data history is a function selected from a group consisting of:
summing the data history, averaging the data history, determining a maximum of the data history, determining a number of values in the data history, determining a first entry in the data history, determining a last entry in the data history, determining a subsequence of the data history, performing a reduction operation, and performing a statistical function.

30. A computer system comprising:
a processor;
memory coupled to the processor, wherein the memory contains a translator for translating source code into object code, wherein the translator comprises instructions, wherein the instructions when executed on the processor comprise:
recognizing a history operator and a history operand in the source code, wherein the history operator and the history operand are programming-language constructs, the history operand representing a sequence of data associated with a data history of a history operand instance and the history operator representing a function that object code will perform on the data history associated with the history operand, wherein the source code is contained in the memory;
in response to recognizing the history operand, finding at least one instance of the history operand in the source code;
allocating storage for the data history associated with the history operand;
generating first object code associated with each instance, wherein the first object code, when executed, saves the data history associated with the history operand in the storage; and generating second object code that, when executed, performs the history operator on the data history, wherein the history operator is capable of being referenced in the source code.

31. The computer system of claim 30, wherein the first object code further saves values assigned to a variable, wherein the variable is an instance of the history operand.

32. The computer system of claim 30, wherein the second object code, when executed, performs a function selected from a group consisting of:
summing the data history, averaging the data history, determining a maximum of the data history, determining a number of values in the data history, determining a first entry in the data history, determining a last entry in the data history, determining a subsequence of the data history, performing a reduction operation, and performing a statistical function.

33. The computer system of claim 30, wherein the history operand comprises a label associated with a source code statement, and wherein the second object code, when executed, further comprises:
counting a number of times the source code statement associated with the label has been executed.

34. A computerized method for interpreting source code, comprising:
recognizing a history operator and a history operand in the source code wherein the history operator and the history operand are programming-language constructs, the history operand representing a sequence of data associated with a data history of a history operand instance and the history operator representing a function that object code will perform on the data history associated with the history operand;
saving the data history associated with an instance of the history operand; and
performing the history operator on the data history,
wherein the history operator is capable of being referenced in the source code.

35. The method of claim 34, wherein saving the data history further comprises saving values assigned to a variable in the data history when the object code is executed.

36. The method of claim 35, wherein the data history further comprises program locations where the assignments occurred and timestamps indicating when the assignment was made.

37. The method of claim 34, wherein the history operand further comprises an expression of variables and wherein saving the data history further comprises saving a result of the expression in the data history.

38. The method of claim 34, wherein saving the data history further comprises allocating storage for the data history.

39. The method of claim 34, wherein performing the history operator on the data history further comprises:
querying the data history based on contents of the data history.

40. The method of claim 34, wherein the history operand comprises a function and the data history comprises values returned by the function.

41. The method of claim 40, wherein the data history further comprises program locations where the values were returned and timestamps indicating when the values were returned.

42. The method of claim 34, wherein the history operand comprises a label associated with a source code statement, and wherein performing the history operator on the data history further comprises:

counting a number of times the source code statement associated with the label was executed.

43. The method of claim 42, wherein the label is programmer-defined.

44. The method of claim 42, wherein the label comprises a programming language control construct.

45. The method of claim 34, wherein performing the history operator on the data history is a function selected from a group consisting of:
summing the data history, averaging the data history, determining a maximum of the data history, selecting an element of the data history, determining a minimum of the data history, determining a number of values in the data history, determining a first entry in the data history, determining a last entry in the data history, determining a subsequence of the data history, performing a reduction operation, and performing a statistical function.

46. The method of claim 34, wherein:
the history operand comprises a programming language keyword representing a loop; and
the history operator comprises an iteration count of the loop.

47. The method of claim 34, wherein the saving of the data history further comprises:
saving the data history in an array, wherein each element of the array comprises a value associated with the history operand at a particular time.

48. The method of claim 34, wherein saving the data history further comprises:
saving the data history in a linked list.

49. The method of claim 34, wherein saving the data history further comprises:
saving the data history in a file.

50. The method of claim 34, wherein performing the history operator on the data history further comprises:
resetting the data history to null.

51. A computer-readable storage medium having computer-executable instructions for performing steps comprising:
recognizing a history operator and a history operand in source code, wherein the history operator and the history operand are programming-language constructs, the history operand representing a sequence of data associated with a data history of a history operand instance and the history operator representing a function that object code will perform on the data history associated with the history operand;
finding at least one instance of the history operand in the source code in response to recognizing the history operand;
saving the data history associated with each instance of the history operand; and
performing the history operator on the data history,
wherein the history operator is capable of being referenced in the source code.

52. The computer-readable medium of claim 51, wherein performing the history operator on the data history further comprises:
querying the data history based on contents of the data history.

53. The computer-readable medium of claim 51, wherein the history operand comprises a label associated with a source code statement, and wherein performing the history operator on the data history further comprises:
counting a number of times the source code statement associated with the label has been executed.

* * * * *